US012649447B2

(12) United States Patent
Macchi et al.

(10) Patent No.: US 12,649,447 B2
(45) Date of Patent: Jun. 9, 2026

(54) VEHICLE ELECTRONICS SYSTEM INCLUDING A PARKING BRAKE EQUIPMENT

(71) Applicant: ITT Italia S.r.l., Lainate (IT)

(72) Inventors: Pietro Roberto Macchi, Turin (IT); Stefano Serra, Saluzzo (IT); Marco Terranova, Turin (IT); Umberto Vignolo, Porte (IT)

(73) Assignee: ITT Italia S.r.l., Lainate (IT)

( * ) Notice: Subject to any disclaimer, the term of this patent is extended or adjusted under 35 U.S.C. 154(b) by 336 days.

(21) Appl. No.: 18/033,310

(22) PCT Filed: Sep. 27, 2021

(86) PCT No.: PCT/EP2021/076455
§ 371 (c)(1),
(2) Date: Apr. 21, 2023

(87) PCT Pub. No.: WO2022/083974
PCT Pub. Date: Apr. 28, 2022

(65) Prior Publication Data

US 2023/0391300 A1 Dec. 7, 2023

(30) Foreign Application Priority Data

Oct. 23, 2020 (IT) ......................... 102020000025201

(51) Int. Cl.
B60T 8/171 (2006.01)
B60T 8/172 (2006.01)
B60T 8/174 (2006.01)

(52) U.S. Cl.
CPC .............. B60T 8/171 (2013.01); B60T 8/172 (2013.01); B60T 8/174 (2013.01); *B60T 2201/06* (2013.01); *B60T 2250/00* (2013.01)

(58) Field of Classification Search
CPC .......... B60T 8/171; B60T 8/172; B60T 8/174; B60T 2201/06; B60T 2250/00
(Continued)

(56) References Cited

U.S. PATENT DOCUMENTS

| | | | | |
|---|---|---|---|---|
| 6,959,794 B2 * | 11/2005 | Ralea | ...................... | B60T 7/085 |
| | | | | 188/196 R |
| 7,143,873 B2 * | 12/2006 | Pascucci | .............. | B60T 13/741 |
| | | | | 188/72.2 |

(Continued)

FOREIGN PATENT DOCUMENTS

| | | |
|---|---|---|
| DE | 10 2008 045693 | 3/2009 |
| DE | 10 2010 043320 | 5/2012 |

(Continued)

OTHER PUBLICATIONS

Written Opinion for PCT Application No. PCT/EP2021/076455, in 6 pages.

(Continued)

*Primary Examiner* — Christopher P Schwartz
(74) *Attorney, Agent, or Firm* — VIA LLP

(57) ABSTRACT

A vehicle electronic system including a parking brake equipment, comprising a brake element (2) including either a brake pad or a brake shoe, said brake element (2) including an electrical circuit equipped with one or more sensors (3, 4, 5) for real-time detection of signals relating to temperatures and/or to normal forces and/or to shear forces and having electrical terminals arranged in a zone for collecting the signals from the brake element, said vehicle electronic parking brake system further comprising an actuator (8) of the brake element (2), a controller (7) delivering a braking force command to the actuator (8), and regulating means (9, 10) driving the controller (7), wherein the regulating means (9, 10) include a closed regulating loop of the braking force including a reference braking force generator (10), said (Continued)

closed regulating loop of the braking force being communicating with said sensors (3, 4, 5) to acquire at least one of temperatures and/or normal forces and/or shear forces measurements.

16 Claims, 5 Drawing Sheets

(58) Field of Classification Search
USPC .................................................. 188/156–164
See application file for complete search history.

(56) References Cited

U.S. PATENT DOCUMENTS

| | | | |
|---|---|---|---|
| 7,185,745 | B2 | 3/2007 | Godlewsky et al. |
| 7,644,998 | B2 * | 1/2010 | Nishino .................. B60T 8/885 |
| | | | 303/146 |
| 9,033,427 | B2 * | 5/2015 | Berger .................... B60T 13/58 |
| | | | 303/11 |
| 9,744,951 | B2 * | 8/2017 | Sussek .................. B60T 13/588 |
| 9,939,035 | B2 | 4/2018 | Donzelli et al. |
| 9,964,167 | B2 | 5/2018 | Martinotto et al. |
| 10,138,968 | B2 | 11/2018 | Donzelli et al. |
| 10,208,822 | B2 | 2/2019 | Donzelli et al. |
| 10,227,064 | B2 | 3/2019 | Serra et al. |
| 10,295,006 | B2 | 5/2019 | Serra et al. |
| 10,408,292 | B2 | 9/2019 | Donzelli et al. |
| 10,451,130 | B2 | 10/2019 | Solari et al. |
| 10,495,168 | B2 | 12/2019 | Serra et al. |
| 10,598,239 | B2 | 3/2020 | Martinotto et al. |
| 10,677,304 | B2 | 6/2020 | Donzelli et al. |
| 10,955,017 | B2 | 3/2021 | Serra et al. |
| 11,047,440 | B2 | 6/2021 | Serra et al. |
| 11,104,613 | B2 | 8/2021 | Colombo et al. |
| 11,107,298 | B2 | 8/2021 | Serra et al. |
| 11,280,721 | B2 | 3/2022 | Xicola et al. |
| 11,441,629 | B2 | 9/2022 | Solari et al. |
| 11,499,598 | B2 | 11/2022 | Galimberti et al. |
| 11,519,475 | B2 | 12/2022 | Serra et al. |
| 2010/0235065 | A1 | 9/2010 | Loga et al. |
| 2019/0005743 | A1 | 1/2019 | Serra |
| 2019/0351889 | A1 * | 11/2019 | Serra ...................... F16D 66/00 |

FOREIGN PATENT DOCUMENTS

| | | |
|---|---|---|
| DE | 10 2016 200614 | 7/2017 |
| GB | 2499696 | 8/2013 |
| WO | WO 2020/127210 | 6/2020 |
| WO | WO2022/083974 | 4/2022 |

OTHER PUBLICATIONS

International Search Report for International application No. PCT/EP2021/076455, mailed Dec. 14, 2021, in 4 pages.

* cited by examiner

VEHICLE ELECTRONICS SYSTEM INCLUDING A PARKING BRAKE EQUIPMENT

BACKGROUND

The following disclosure relates to a vehicle electronic system including a parking brake equipment.

SUMMARY

A traditional handbrake is very simple, in fact, by lifting a lever two cables are pulled to the rear brakes causing the brake pads (or shoes) to close against the discs (or drums) to keep the rear wheels firmly in place.

An electronic parking brake (EPB) replaces this mechanical system with an electrical one.

The EPB systems provide other functions like automatic release of the park brakes, the re-clamping using additional force on detection of vehicle or the hill-hold function, which applies brakes to prevent roll-back when pulling away on a gradient.

Standard EPB works in open loop to apply a braking force to the vehicle when required by driver through manual or automatic command.

This use in open loop encounters some limitations that must be overcome in terms of the EPB design system in order to guarantee its correct operation in all circumstances.

One of the phenomena that can occur in the interface between the brake pad and disc is the change in the pad thickness due to the swelling of the materials (for example due to the temperature cooling down).

The brake pad change in temperature generates a force loss after the EPB application due to the variation in the pad and rotor thickness (in same cases even up several hundreds of μm).

This is a well know phenomena that need to be compensated in order to guarantee that the car stay still once EPB has been applied.

If the car is parked on an inclined street, then the problem is even wider.

The open loop strategy adopted in standard EPB do not allow real time recovering of EPB force loss nor adjusting the braking force to vehicle weight variation.

The strategy usually applied in standard EPB is a periodical force re-application, often combined with the indication of the vehicle inclination on the road.

Since the open loop strategy does not allow measuring the variations that occur in caliper, EPB manufacturers are often forced to design systems that are overestimated both in size and in the number of re-clamping (and applied forces).

These great forces, moreover repeated, lead to a weakening of the brake pads and of the material, which in the long term can damage the brake pads.

The technical task described in the present disclosure is, therefore, to obviate such limitations.

The technical task according to the present disclosure are achieved by providing a vehicle electronic system including a parking brake equipment comprising a brake element including either a brake pad or a brake shoe, said brake element including an electrical circuit equipped with one or more sensors for real-time detection of signals relating to temperatures and/or to normal forces and/or to shear forces and having electrical terminals arranged in a zone for collecting the signals from the brake element, said vehicle electronic system further comprising an actuator of the brake element, a controller delivering a braking force command to the actuator, and regulating means driving the controller, wherein the regulating means include a closed regulating loop of the braking force including a reference braking force and/or torque generator, said closed regulating loop of the braking force being communicating with said sensors to acquire at least one of temperatures and/or normal forces and/or shear forces measurements.

In an embodiment the vehicle electronic system including a parking brake equipment further comprises an accelerometer and/or an inclinometer, said closed regulating loop of the braking force being communicating with said accelerometer and/or inclinometer to acquire measurements therefrom.

Said accelerometer and/or an inclinometer can be onboard the vehicle or more particularly on board the brake element.

In an embodiment said closed regulating loop of the braking force further includes a node comparator of the measured values of normal forces and/or shear forces and/or torque value derived therefrom with reference value of braking force and/or torque.

In an embodiment said reference value of braking force and/or torque is fixed.

In an embodiment said reference value of braking force and/or torque is variable.

In an embodiment said reference value of braking force and/or torque is determined by the measurements acquired of said at least one of temperatures and/or normal forces and/or shear forces and/or torque measure derived therefrom.

In an embodiment said reference value of braking force and/or torque is further determined by the measurements acquired of said accelerometer and/or inclinometer.

In an embodiment said reference value of braking force and/or torque is only determined by the measurements acquired of said temperatures sensor.

The present disclosure also provides a method of clamping a wheel of a vehicle with the above referred vehicle electronic system including a parking brake equipment, wherein a braking force variation is compensated as follows:

said acquired at least one of temperatures and/or normal forces and/or shear forces measurements are processed to determine a reference braking force and/or torque value; and/or said at least one normal forces and/or shear forces measurements are processed in combination with either said reference braking force and/or torque value or a fixed reference braking force and/or torque value to drive the controller; and said controller transmits to the actuator a braking force and/or torque command.

In an embodiment said acquired measurements of said accelerometer and/or inclinometer are further processed by said reference braking force and/or torque generator to determine the reference braking force and/or torque value.

In an embodiment said measurements are processed real time.

In an embodiment parking brake equipment failure in activation or deactivation is detected by a consistency check between the reference braking force value and the measurements.

BRIEF DESCRIPTION OF THE DRAWINGS

Various embodiments are depicted in the accompanying drawings for illustrative purposes and should in no way be interpreted as limiting the scope of this disclosure. Various features of different disclosed embodiments can be combined to form additional embodiments, which are part of this disclosure.

DETAILED DESCRIPTION OF CERTAIN EMBODIMENTS

Figures 1, 2:
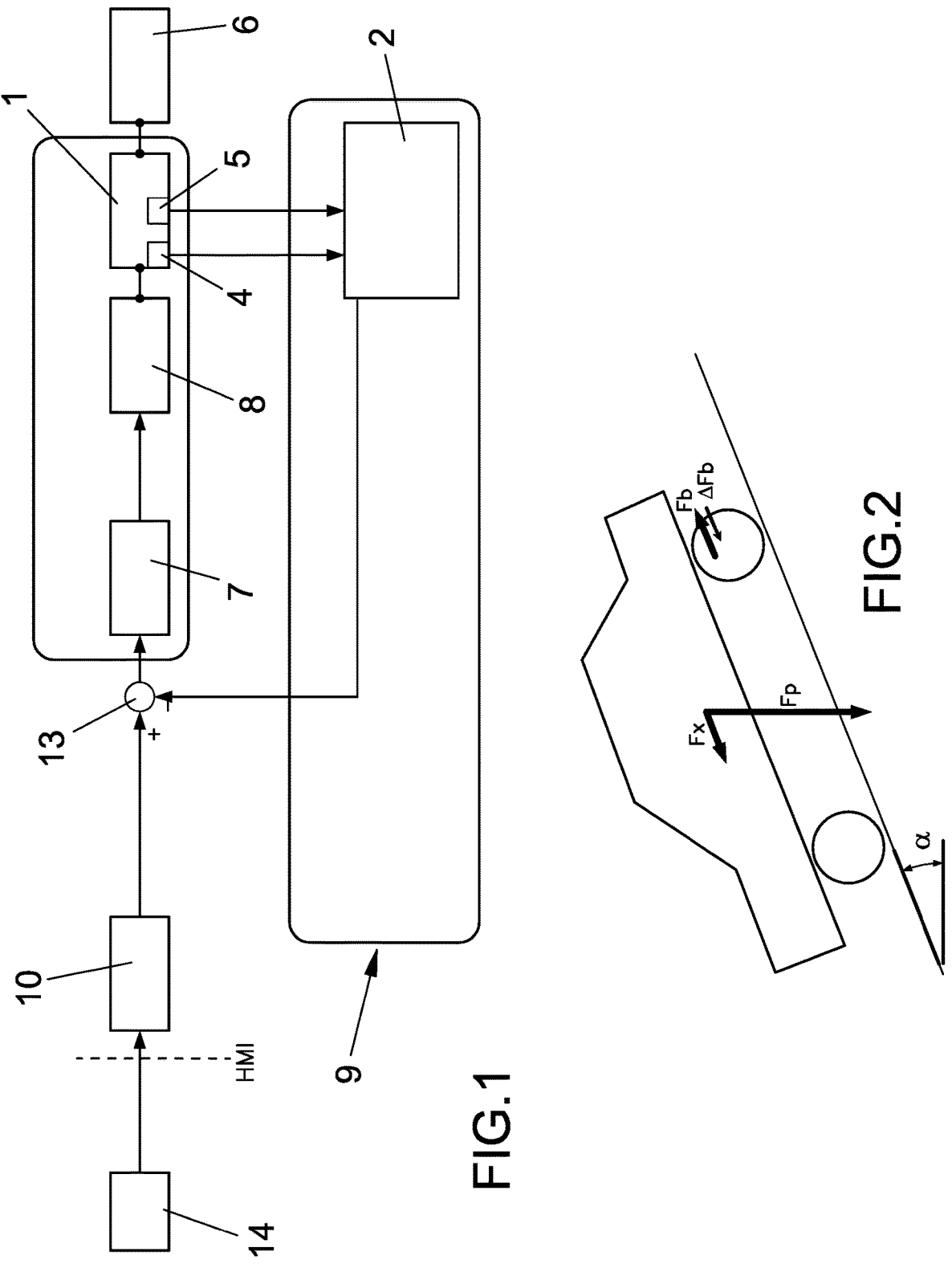
FIG. 1 schematically illustrates a layout of the vehicle electronic system including a parking brake equipment according to a first embodiment, adapted to compensate braking force variation due to brake cooling down.
FIG. 2 schematically illustrates the total clamping force required on a sloped road to prevent the slip of a vehicle equipped with a vehicle electronic system including a parking brake equipment of FIG. 1.

In the following detailed description, reference is made to the accompanying drawings, which form a part hereof. In the drawings, similar reference numbers typically identify similar components, unless context dictates otherwise. The illustrative embodiments described in the detailed description and drawings are not meant to be limiting. Other embodiments may be utilized, and other changes may be made, without departing from the spirit or scope of the subject matter presented here. The aspects of the present disclosure, as generally described herein, and illustrated in the figures, may be arranged, substituted, combined, and designed in a wide variety of different configurations, all of which are explicitly contemplated and made a part of this disclosure.

The vehicle electronic system according to the present invention includes a parking brake equipment, for instance but not necessarily an electronic or an electro mechanical brake system or a smart caliper brake system.

Only for exemplification but not for a limitative purpose hereinbelow we refer to an EPB system of a vehicle 6, comprising a brake 1 having a smart brake element 2 including either a brake pad for disk brake or a brake shoe for drum brake.

The smart brake element 2 includes an electrical circuit equipped with one or more sensors, in particular, temperature sensor 3 and/or normal force sensor 4 and/or shear force sensor 5 for real-time detection of signals relating to temperatures and/or to normal forces and/or to shear forces and having electrical terminals arranged in a zone for collecting the signals from the brake element.

The EPB system further comprises an actuator 8 of the brake element 2, a controller 7 delivering a braking force command to the actuator 8, and regulating means 9, 10 driving the controller 7.

Advantageously the regulating means 9 include a closed regulating loop of the braking force including a reference braking force and/or torque generator 10.

Furthermore the closed regulating loop of the braking force is in communication with the sensors 3, 4, 5 to acquire at least one of temperatures and/or normal forces and/or shear forces measurements.

The electronic parking brake system 1 may further comprise an accelerometer 11 and/or an inclinometer 12 of the vehicle 6.

The closed regulating loop 9 of the braking force is in this case in communication also with the accelerometer 11 and/or inclinometer 12 to acquire measurements therefrom.

The closed regulating loop 9 of the braking force may further include a node comparator 13 comparing the measured values of normal forces and/or shear force and/or torque value derived therefrom with reference value of braking force.

The reference value of braking force and/or torque may be either fixed or variable.

The reference value braking force and/or torque can be determined by the measurements acquired of temperatures and/or normal forces and/or shear forces.

The reference value of braking force and/or torque can be determined by only the measurements acquired of said temperatures sensor.

The reference value of braking force and/or torque can be further determined by the measurements acquired of the accelerometer 11 and/or inclinometer 12.

The smart brake element in an embodiment is a sensorized brake pad comprising a support plate, a friction pad, and an electrical circuit equipped with the above sensors for real-time detection of signals relating to temperatures and/or to normal forces and/or to shear forces.

The normal force and shear force sensors may comprise piezoceramic sensors, but alternatively can also be capacitive or piezoresistive sensors.

The temperature sensors can be thermistors, for example PT1000, PT200 or PT100.

The electrical circuit has electrical terminals arranged in a zone for collecting the signals from said brake pad.

The support plate, preferably but not necessarily made of a metal, directly supports the electrical circuit.

The friction pad is applied on the side of the support plate where the electrical circuit is present, the electrical circuit is thus incorporated between the support plate and the friction pad.

In some embodiments, the smart brake pad is composed mostly by four different parts: a metallic support plate, a sensing layer on the backplate (electronic circuit, interconnection media and integrated force and temperature sensors), an optional damping layer and a friction material layer.

During use, the smart brake element is capable of transmitting an electrical signal which is proportional to detected temperatures of the brake element and/or the braking forces applied to the brake element as a result of coming into contact with the element being braked (disk or drum).

The shear sensor in an embodiment may have, preferably, at least 0.2 mm of thickness and made of piezoceramic material with operating temperature higher than 200° C.

The temperature sensor in an embodiment may have, preferably, a range of usage, preferable, of −50 to 600° C.

The temperature sensor measures the temperature of the smart brake element and can also be used for compensation purposes for the change of signals in function of temperature.

The normal force sensor in an embodiment may have, preferably, at least 0.2 mm of thickness and piezoceramic material with a Curie temperature higher than 200° C.

The electrical circuit on which the sensors are installed can be electrically insulated and have appropriately shaped branches to arrange the sensors in discrete positions on the support plate.

The EPB system can be used to estimate and compensate both force variation due to brake cooling down and load increase on brake due to external causes.

The embodiment shown in FIG. 1 allows compensating a braking force variation due to brake cooling down and to this end it requires the measurement of normal and/or shear force and/or torque value derived therefrom through the normal force sensor 4 and/or shear force sensor 5.

Either automatically or manually by the driver 14 the EPB system can be switched on and a fixed reference braking force and or torque value is generated by the reference force/torque generator 10 and sent to the node comparator 13.

The normal force sensor 4 and/or shear force sensor 5 directly measure the normal force and/or shear force; this measure are fed as feedback to the node comparator 13 that in turn compares it with the fixed reference braking force and/or torque value and elaborates accordingly an error signal that is automatically sent to the controller 7 that generates a braking force command transmitted to the actuator 8 of the smart brake element 2.

This closed loop control allows modulating real time the braking force variation in order to compensate, for instance, smart brake element 2 thickness reduction (swelling phenomena).

Indeed, re clamping using normal force feedback can be used to compensate smart brake element 2 thickness reduction with temperature.

Initially a clamp force is applied at high temperature, then the applied braking force tends to decrease due the reduction of smart brake element 2 materials and rotor swelling, so the braking force tends to decrease risking to be not enough to guarantee the vehicle blockage.

However the normal force and/or shear force variation is detected and a real time re clamping strategy is applied when the normal force and/or shear force measured drops below a defined threshold, which guarantees the stationarity of the vehicle. A new and correct braking force is finally implemented to ensure the vehicle stop. Consistency check between reference value and measured value could also be used to detect EPB failure in activation or deactivation.

FIG. 2 shows which is the condition to keep the vehicle stationary when the latter is parked in a sloped road.

In order to prevent the vehicle slip it is necessary to guarantee:

$$Fb - \Delta Fb \geq Fx$$

where

Fb is the initial braking force

ΔFb is the variation of braking force due to temperature decrease of the braking element Fp is the weight of the vehicle, a is the angle of inclination of the road and Fx=Fp sin α

Figure 3:
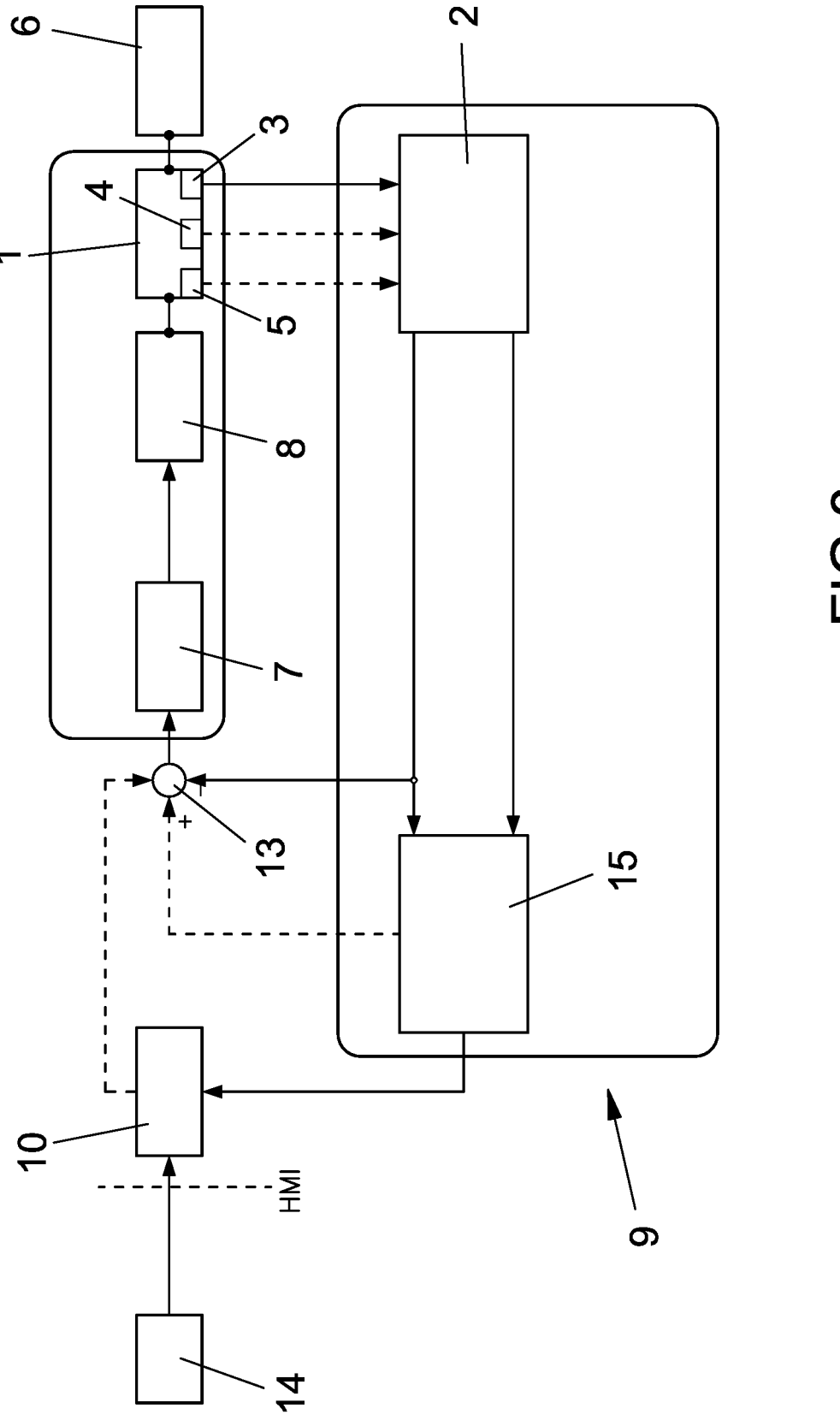
FIG. 3 schematically illustrates a layout of the vehicle electronic system including a parking brake equipment according to a second embodiment, adapted to compensate both braking force variation due to brake cooling down and loading increase on brake due to external causes.
Figure 4:
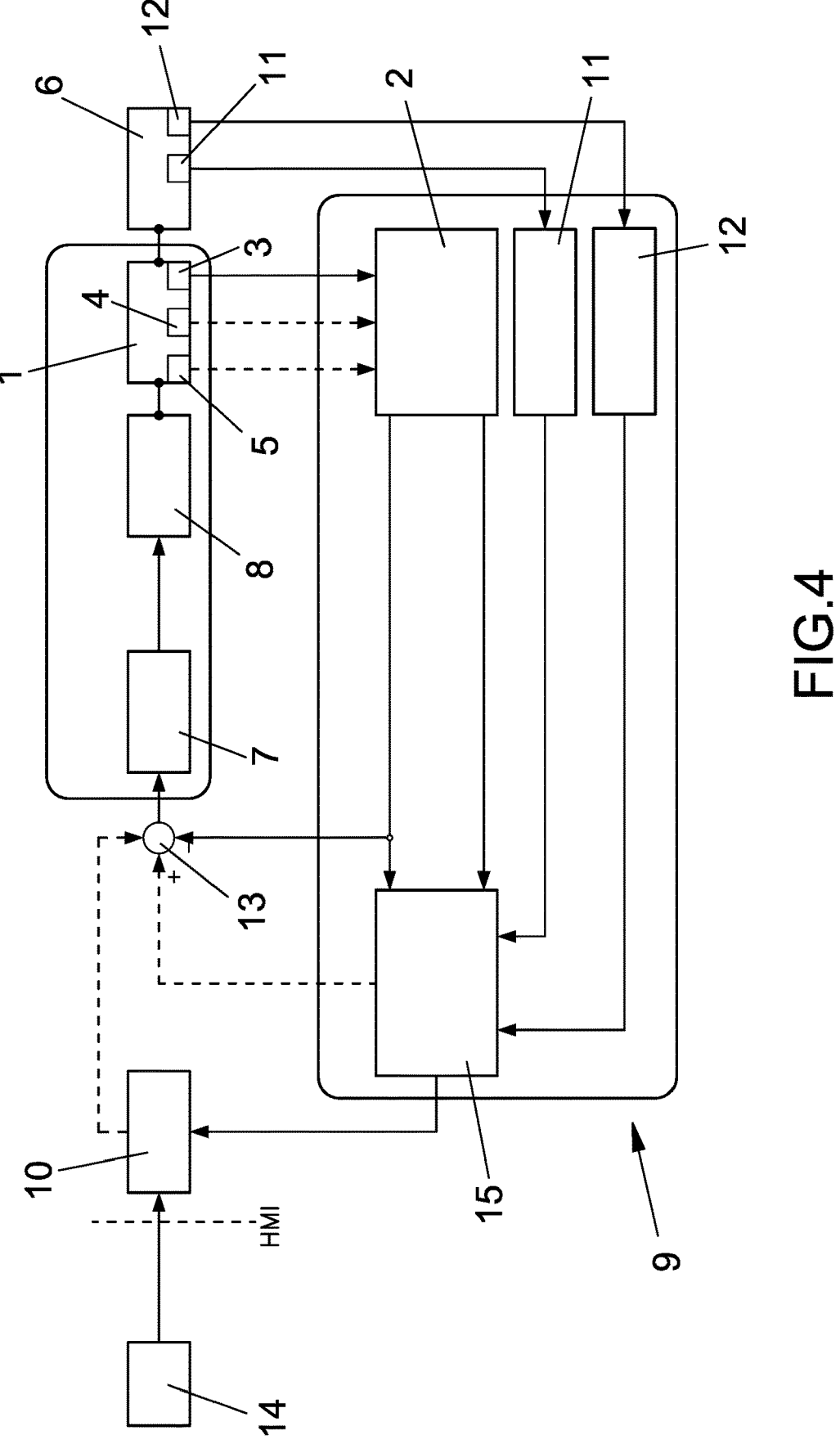
FIG. 4 schematically illustrates a layout of the vehicle electronic system including a parking brake equipment according to a third embodiment, adapted to compensate both braking force variation due to brake cooling down and loading increase on brake due to external causes.

The second and third embodiments shown in FIGS. 3 and 4 are more articulated with respect to the first one and they allow a better performance in EPB application.

Indeed, they allow compensating both braking force variation due to brake cooling down and loading increase on brake due to external causes.

Reference is made now to second embodiment shown in FIG. 3 which requires the measurement of normal force and/or torque and/or temperatures provided by the smart braking element 2.

Normal force and/or shear force and/or temperatures acquired from sensors 3, 4, 5 are used by the regulating means 9, in this case including a state observer 15, to create a variable braking force and/or torque reference value needed to lock the vehicle taking into account the effects of variation in brake element thickness, vehicle weight, variability of external conditions, etc. . . . .

In particular, also the torque variation measured/estimated through the sensors 4, 5 of the smart braking element 2 can be used for a smart re clamping in order to avoid/minimize slip phenomena.

In an embodiment, the working phases can be described as follows:

EPB activation either automatically or by the driver 14

Estimation of torque variation in the state observer 15 through measurements from sensors 4 and/or 5 of the smart brake element 2, and generation of a reference braking force and/or torque value, where torque variation is estimated in EPB-ON condition Adjusted braking force command generated This method uses torque measurement only, but it can be improved by combination of torque measurement with normal force and/or shear force and/or temperature measurements to update the reference braking force and/or torque value.

Reference braking force and/or torque value so generated in the state observer 15 can be used as direct input of the braking force control loop or it can be integrated into the existing reference generator 10.

The normal force measurement through the normal force sensor 4 may be used or not as a feedback to close the control loop.

Consistency check between reference and measurement may be also used to detect EPB failure in activation or deactivation.

Figures 5A, 5B:
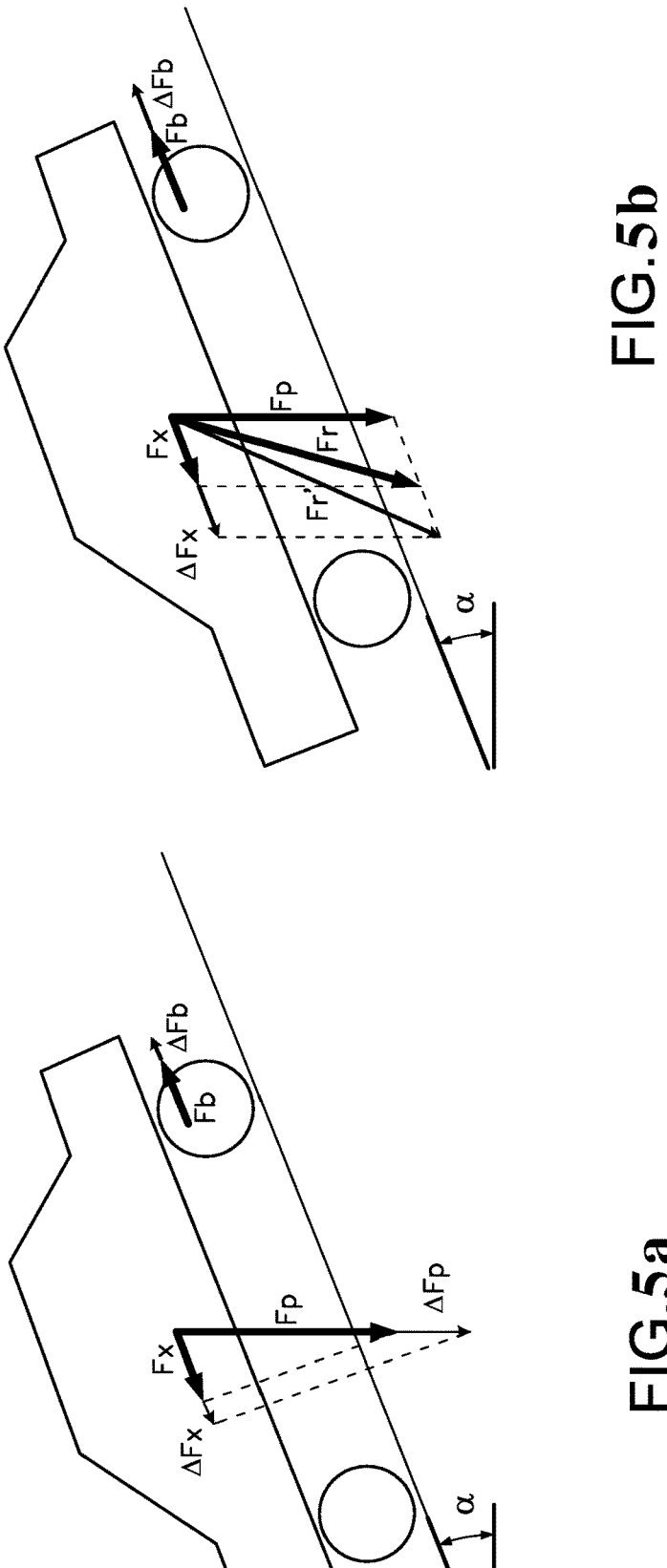
FIG. 5*a* and respectively FIG. 5*b* schematically illustrate the total clamping force required due to a weight variation (passengers getting in the parked vehicle on a sloped road, for instance) and respectively due to external circumstance (a vehicle bumping during parking along a sloped road) to prevent the slip of a vehicle equipped with a vehicle electronic system including a parking brake equipment system of FIG. 3 or 4.

FIG. 5a shows which is the condition to keep the vehicle stationary when the latter is parked in a sloped road and a weight variation occurs due for instance to passengers getting in the parked vehicle.

In order to prevent the vehicle slip it is necessary to guarantee:

$$Fb + \Delta Fb \geq Fx + \Delta Fx = Fp \sin \alpha + \Delta Fp \sin \alpha$$

where

Fb is the initial braking force

Fp is the weight of the vehicle

ΔFx is the additional weight

ΔFb is the required additional braking force to keep the vehicle stationary

α is the angle of inclination of the road, and Fx=Fpsin α

FIG. 5b shows which is the condition to keep the vehicle stationary due to external circumstance, for instance when the vehicle is parked in a sloped road and a vehicle bumping during parking occurs.

In order to prevent the vehicle slip it is necessary to guarantee:

$$Fb+\Delta Fb \geq Fx+\Delta Fx=Fp \sin \alpha+\Delta Fx$$

Fb is the initial braking force

Fp is the weight of the vehicle

ΔFx is the additional force generated by the bump

ΔFb is the required additional braking force to keep the vehicle stationary

α is the angle of inclination of the road, and Fx=Fpsin α

In the above examples the angle α can be measured directly with the instruments currently used on the vehicle like accelerometer 11 or inclinometer 12.

Reference is made now to third embodiment shown in FIG. 4 which requires the measurement of normal force and/or torque and/or temperatures provided by the smart braking element 2, and measurement of vehicle acceleration inclination provided by the accelerometer 11 and/or inclinometer 12.

The only difference with the second embodiment is that, additionally, also measures acquired from accelerometer 11 and/or inclinometer 12 are used in the state observer 15 to create the braking force and/or torque reference value needed to lock the vehicle taking into account the effects of variation in brake element 2, vehicle weight, variability of external conditions, etc. . . . .

Again, reference braking force and/or torque value so generated in the state observer 15 can be used as direct input of the braking force control loop or it can be integrated into the existing reference generator 10.

Again, the normal force measurement through the normal force sensor 4 may be used or not as a feedback to close the control loop.

Again, consistency check between reference and measurement may be also used to detect EPB failure in activation or deactivation.

Figures 6, 7:
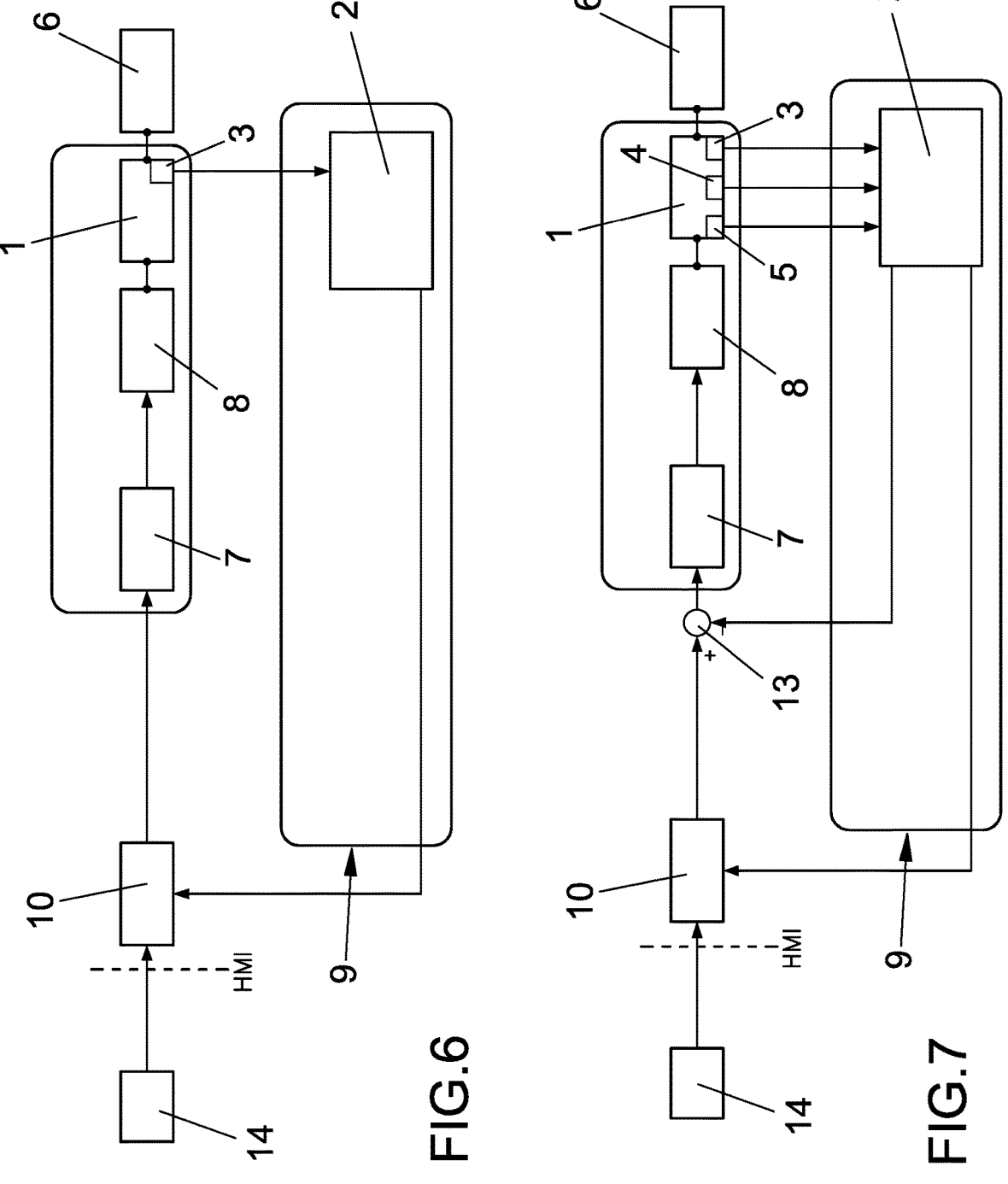
FIG. 6 schematically illustrates a layout of the vehicle electronic system including a parking brake equipment according to a fourth embodiment, adapted to strengthen a re clamping logic by acquisition of the brake element temperature.
FIG. 7 schematically illustrates a layout of the vehicle electronic system including a parking brake equipment according to a fifth embodiment, adapted to strengthen a re clamping logic by acquisition of the brake element temperature.

The fourth and fifth embodiments shown in FIGS. 6 and 7 refer to another technique in order to strengthen the re clamping logic.

In this case temperature of smart brake element 2 is acquired.

The temperature acquisition has a dual purpose: first of all, it predicts unavoidable normal force drop due to friction material swelling variation, secondly it can provide compensation for the operation of the normal force sensor 4.

Reference is made now to FIG. 6.

A direct measurement of the smart brake element 2 temperature can be integrated in existing models, reducing errors and false activations.

In this case a state observer may not be necessary.

In this case a node comparator is not necessary.

In an embodiment, the working phases can be described as follows:

EPB activation either automatically or by the driver 14

Measurement of the temperature from temperature sensor 3 of the smart brake element 2, and generation of a reference braking force and/or torque value in the existing reference generator 10 based on only the measured temperature.

Reference braking force and/or torque value sent to the controller 7 to generate a braking force command transmitted to the actuator 8.

Reference is made now to FIG. 7.

A direct measurement of the smart brake element 2 temperature can be integrated in existing models, reducing errors and false activations.

Also, in this case a state observer may not be necessary.

In this case a node comparator 13 is necessary.

In an embodiment, the working phases can be described as follows:

EPB activation either automatically or by the driver 14

Measurement of the temperature from temperature sensor 3 of the smart brake element 2 and generation of a reference braking force and/or torque value in the existing reference generator 10 based on only the measured temperature Measurement of the normal force and/or shear (torque) force from sensors 4, 5 of the smart brake element 2

Comparation in node comparator 13 between the reference braking force and/or torque value and the normal force and/or shear (or torque) force measure coming from sensors 4, 5 send the output of the comparation to the controller 7 to generate a braking force command transmitted to the actuator 8

Therefore, in this case the measured normal force and/or shear force and/or torque are used as a feedback to close the control loop.

Consistency check between reference and measurement may be also used to detect EPB failure in activation or deactivation.

Generally speaking, with the method of clamping a wheel of a vehicle with the vehicle electronic system according to the present disclosure, the braking force variation is compensated as follows:

the acquired temperatures and/or normal forces and/or shear forces measurements are processed to determine a reference braking force value; and/or said at least one normal forces and/or shear forces measurements are processed in combination with either said reference braking force and/or torque value or a fixed reference braking force and/or torque value to drive the controller 7; and the controller 7 transmits to the actuator 8 a braking force command.

Measurements of the accelerometer 11 and/or inclinometer 12 can of course be further processed to determine the reference braking force and/or torque value.

The measurements are preferably processed real time.

Modifications and variations in addition to those described are naturally possible; the vehicle electronic system including a parking brake equipment thus conceived is susceptible to numerous modifications and variants, all of which fall within the scope of the inventive concept; further, all details may be replaced with other technically equivalent elements. In practice the materials used, as well as the systems, can be any according to the needs and the state of the art.

The invention claimed is:

1. A vehicle electronic system including a parking brake equipment comprising:

a brake element including either a brake pad or a brake shoe, the brake element including an electrical circuit equipped with one or more normal force sensors, one or more shear force sensors, or both, for real-time generation of at least normal force measurements, shear force measurements, or both, and having electrical terminals arranged in a zone for collecting the measurements from the brake element;

an actuator of the brake element;

a controller configured to deliver a braking force command to the actuator; and a regulating apparatus configured to drive the controller, wherein the regulating apparatus comprises a closed regulating loop of braking force, the closed regulating loop including at least one of a generator or a state observer, wherein the generator generates at least one of a reference braking force value or a reference braking torque value;

wherein closed regulating loop of the braking force communicates with the one or more normal force sensors, the one or more shear force sensors, or both, to acquire at least normal force measurements, shear force measurements, or both.

2. A vehicle electronic system including a parking brake equipment according to claim 1, wherein the closed regulating loop of the braking force further includes a node comparator configured to compare measured values of at least one of normal forces, shear forces, or a torque value derived from the shear forces with at least one of the reference braking force value or the reference braking torque value.

3. A vehicle electronic system including a parking brake equipment according to claim 2, wherein at least one of the reference braking force value or the reference braking torque value is fixed.

4. A vehicle electronic system including a parking brake equipment according to claim 2, wherein at least one of the reference braking force value or the reference braking torque value is variable.

5. A vehicle electronic system including a parking brake equipment system according to claim 2, wherein the state observer generates at least one of the reference braking force value or the reference braking torque value.

6. A vehicle electronic system including a parking brake equipment according to claim 2, wherein at least one of the reference braking force value or the reference braking torque value is determined based at least in part on at least one of normal forces, shear forces, or torque value.

7. A vehicle electronic system including a parking brake equipment according to claim 2, wherein the brake element comprises one or more temperature sensors, and wherein at least one of the reference braking force value or the reference braking torque value is determined based on temperature measurements acquired from the one or more temperature sensors.

8. A vehicle electronic system including a parking brake equipment according to claim 1, further comprising at least one of an accelerometer or an inclinometer, wherein the closed regulating loop of the braking force communicates with at least one of the accelerometer or inclinometer to acquire measurements.

9. A vehicle electronic system including a parking brake equipment according to claim 8, wherein at least one of the reference braking force value or the reference braking torque value is determined based at least in part on the measurements acquired from at least one of the accelerometer or inclinometer.

10. A vehicle electronic system including a parking brake equipment according to claim 1, wherein the one or more normal force sensors and the one or more shear force sensors are piezoceramic sensors.

11. A vehicle including the vehicle electronic system including a parking brake equipment according to claim 1.

12. A method of clamping a wheel of a vehicle with a vehicle electronic system including a parking brake equipment, wherein the method includes compensating braking force variation by:

processing, with a regulating apparatus of a parking brake equipment configured to drive a controller of the parking brake equipment, at least one of normal force or shear force measurements acquired from one or more normal force sensors, one or more shear force sensors, or both, to determine at least one of a reference braking force value or a reference braking torque value, wherein the regulating apparatus comprises a closed regulating loop of braking force;

processing, with the regulating apparatus, the at least one of normal force or shear force measurements in combination with at least one of the reference braking force value, the reference braking torque value, a fixed reference braking force, or torque value to drive the controller; and with the controller, transmitting to an actuator of the parking brake equipment a braking force command.

13. A method according to claim 12, further comprising, processing measurements acquired from at least one of an accelerometer or an inclinometer with a generator of the regulating apparatus to determine at least one of the reference braking force value or reference braking torque value, wherein the generator generates at least one of the reference braking force value or the reference braking torque value.

14. A method according to claim 12, wherein the at least one of normal force or shear force measurements are processed real time.

15. A method according to claim 12, further comprising detecting parking brake equipment failure in activation or deactivation by a consistency check between the at least one of the reference braking force value or reference braking torque value and the at least one of normal force or shear force measurements.

16. A method according to claim 12, further comprising, processing measurements acquired from at one or more temperature sensors with a generator of the regulating apparatus to determine at least one of the reference braking force value or reference braking torque value, wherein the generator generates at least one of the reference braking force value or reference braking torque value.

\* \* \* \* \*